US007624251B2

(12) United States Patent
Gonion et al.

(10) Patent No.: US 7,624,251 B2
(45) Date of Patent: *Nov. 24, 2009

(54) INSTRUCTIONS FOR EFFICIENTLY ACCESSING UNALIGNED PARTIAL VECTORS

(75) Inventors: Jeffry E. Gonion, Sunnyvale, CA (US);
Keith E. Diefendorff, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 11/655,656

(22) Filed: Jan. 18, 2007

(65) Prior Publication Data

US 2008/0114969 A1    May 15, 2008

Related U.S. Application Data

(63) Continuation-in-part of application No. 11/591,804, filed on Nov. 1, 2006.

(51) Int. Cl.
*G06F 9/00* (2006.01)
(52) U.S. Cl. .................. 712/204; 712/223; 712/225; 712/5; 712/226
(58) Field of Classification Search .................. 712/4, 712/220, 204, 225, 226, 300, 5, 223
See application file for complete search history.

(56) References Cited

U.S. PATENT DOCUMENTS

| 4,435,792 | A | * | 3/1984 | Bechtolsheim | ......... 365/189.02 |
| 4,823,286 | A | * | 4/1989 | Lumelsky et al. | ........... 345/611 |
| 4,903,217 | A | * | 2/1990 | Gupta et al. | ................ 345/545 |
| 5,450,605 | A | * | 9/1995 | Grochowski et al. | .......... 712/23 |
| 5,630,083 | A | * | 5/1997 | Carbine et al. | .............. 712/212 |
| 5,751,981 | A | * | 5/1998 | Witt et al. | .................... 712/204 |
| 5,758,116 | A | * | 5/1998 | Lee et al. | ..................... 712/210 |
| 6,049,860 | A | * | 4/2000 | Krygowski et al. | ........... 712/25 |
| 6,336,178 | B1 | * | 1/2002 | Favor | .......................... 712/23 |
| 6,453,278 | B1 | * | 9/2002 | Favor et al. | ................... 703/27 |
| 6,496,923 | B1 | * | 12/2002 | Gruner et al. | ............... 712/213 |
| 7,051,168 | B2 | * | 5/2006 | Gschwind et al. | ........... 711/154 |
| 7,219,212 | B1 | * | 5/2007 | Sanghavi et al. | ............... 712/6 |
| 7,301,369 | B2 | * | 11/2007 | Kanno et al. | .................. 326/41 |
| 7,302,552 | B2 | * | 11/2007 | Guffens et al. | .............. 712/204 |
| 2003/0056064 | A1 | * | 3/2003 | Gschwind et al. | ........... 711/154 |
| 2005/0257028 | A1 | * | 11/2005 | Guffens et al. | ................ 712/24 |

(Continued)

*Primary Examiner*—Eddie P Chan
*Assistant Examiner*—Idriss N Alrobaye
(74) *Attorney, Agent, or Firm*—Park, Vaughan & Fleming LLP; Steven E. Stupp

(57) ABSTRACT

One embodiment of the present invention provides a processor that is configured to execute load-swapped-partial instructions. An instruction fetch unit within the processor is configured to fetch the load-swapped-partial instruction to be executed. Note that the load-swapped-partial instruction specifies a source address in a memory, which is possibly an unaligned address. Furthermore, an execution unit within the processor is configured to execute the load-swapped-partial instruction. This involves loading a partial-vector-sized datum from a naturally-aligned memory region encompassing the source address. While loading the partial-vector-sized datum, bytes of the partial-vector-sized datum are rotated to cause the byte at the specified source address to reside at the least-significant byte position within the partial-vector-sized datum for a little-endian memory transaction, or to cause the byte to be positioned at the most-significant byte position within the partial-vector-sized datum for a big-endian memory transaction.

18 Claims, 10 Drawing Sheets

U.S. PATENT DOCUMENTS

2007/0079305 A1* 4/2007 Duerinckx ................ 717/151
2007/0106881 A1* 5/2007 Thornton ................ 712/223
2007/0115150 A1* 5/2007 Kanno et al. ................ 341/50
2007/0124722 A1* 5/2007 Gschwind ................ 717/106
2007/0186077 A1* 8/2007 Gschwind et al. ................ 712/3
2007/0233766 A1* 10/2007 Gschwind ................ 708/490

* cited by examiner

WRITES

AFTER STORE OPERATIONS

INSTRUCTIONS FOR EFFICIENTLY ACCESSING UNALIGNED PARTIAL VECTORS

CROSS REFERENCE TO RELATED APPLICATIONS

This application is a continuation-in-part of co-pending U.S. patent application Ser. No. 11/591,804 filed on Nov. 1, 2006, entitled "Instructions for Efficiently Accessing Unaligned Vectors," the entire contents of which are herein incorporated by reference.

BACKGROUND

1. Field of the Invention

The present invention relates to techniques for improving computer system performance. More specifically, the present invention relates to instructions for efficiently accessing a partial vector located at an arbitrarily aligned memory address.

2. Related Art

In Single-Instruction-Multiple-Data (SIMD)-vector processors, accessing a vector in memory that is not naturally aligned (i.e., which resides at an address that is not an integer multiple of the vector length in bytes) is an inefficient multi-step process, which is complicated by the need to handle edge-cases without producing spurious virtual-memory faults. For example, see FIG. 1A, which presents a block diagram illustrating an existing memory 100 that includes both an aligned vector 102 and an unaligned vector 104.

Referring to FIG. 1B, which presents a block diagram illustrating an existing alignment process, conventional practice for manipulating unaligned vectors is to process the beginning 108 and ending portions 110 of the unaligned vectors separately, thereby allowing the large inner portion of the vectors to be processed as a naturally aligned vector 112, which is much faster. However, this is a complicated process and it is not always possible to perform it in all systems and applications.

Many processors that support vector data types provide memory-access instructions that automatically handle mis-alignment by loading vector data from unaligned addresses into vector registers or storing data from vector registers into unaligned addresses. For example, FIG. 2B presents a block diagram of alignment circuitry 204 illustrating how an unaligned vector which spans two or more registers is aligned to fit into a single register. However, this approach places the burden of aligning data on the processor hardware, which must perform multiple aligned memory accesses and must assemble elements from each access into a coherent vector. Note that this hardware-based technique requires additional hardware and is consequently more expensive. Furthermore, this technique is inefficient for streaming because it discards good data during the streaming process.

Explicitly handling alignment in software (rather than in hardware) is even less efficient because it involves executing multiple load-store and bit-manipulation instructions for each vector of data that is processed.

It is also common for some types of code, such as mathematical kernels, to be implemented in several variants, each handling a different alignment case as efficiently as possible. This approach is time-consuming and error-prone, and also increases the debugging effort and lengthens the development process. Furthermore, the variants which handle unaligned data are less efficient than the aligned variants. This difference in efficiency can cause performance variations that depend on the alignment of the data.

Hence what is needed is a technique for efficiently accessing unaligned vectors without the above-described problems.

SUMMARY

One embodiment of the present invention provides a processor that is configured to execute load-swapped-partial instructions. An instruction fetch unit within the processor is configured to fetch the load-swapped-partial instruction to be executed. Note that the load-swapped-partial instruction specifies a source address in a memory, which is possibly an unaligned address. Furthermore, an execution unit within the processor is configured to execute the load-swapped-partial instruction. This involves loading a first partial-vector-sized datum from a first naturally-aligned memory region encompassing the source address. While loading the first partial-vector-sized datum, bytes of the first partial-vector-sized datum are rotated to cause the byte at the specified source address to reside at the least-significant byte position within the first partial-vector-sized datum for a little-endian memory transaction, or to cause the byte at the specified source address to be positioned at the most-significant byte position within the first partial-vector-sized datum for a big-endian memory transaction.

In some embodiments, the first partial-vector-sized datum is loaded via a load-store path between a cache memory and a register. Note that a ratio of a first number of bits in a vector register to a second number of bits in the load-store path may be rounded up to a nearest integer M. Furthermore, in some embodiments the load-swapped-partial instruction rotates bytes of the first partial-vector-sized datum as the first partial-vector-sized datum passes through the load-store path.

In some embodiments, the load-swapped-partial instruction is a load-swapped-partial-and-duplicate instruction which copies the first partial-vector-sized datum to M register locations.

In some embodiments, the load-swapped-partial instruction is a load-swapped-partial-and-shift instruction which shifts register data to make room for the first partial-vector-sized datum.

In some embodiments, the load-swapped-partial instruction rotates bytes of the first partial-vector-sized datum N positions in a direction determined by the endian-ness of the memory transaction. Note that N is equivalent to the source address specified by the instruction modulo the first partial-vector-sized datum length in bytes. Furthermore, the first partial-vector-sized datum is rotated to the left N byte positions for a big-endian memory transaction, or the first partial-vector-sized datum is rotated to the right N byte positions in the case of little-endian memory transactions.

In another embodiment of the present invention the processor is configured to execute store-swapped-partial instructions. In doing so, the instruction fetch unit within the processor is configured to fetch the store-swapped-partial instruction to be executed. Note that the store-swapped-partial instruction specifies a destination address in the memory, which is possibly an unaligned address. Furthermore, the execution unit within the processor is configured to execute the store-swapped-partial instruction. This involves storing a second partial-vector-sized datum in a second naturally-aligned memory region encompassing the destination address. While storing the second partial-vector-sized datum, bytes of the second partial-vector-sized datum are rotated to cause the least significant byte of the second partial-vector-sized datum to be stored at the specified destination address on the little-endian processor, or to cause the most significant byte of the second partial-vector-sized datum to be stored at the specified destination address on the big-endian processor, or to cause the specified byte to be stored to the destination address in the case of the endian-specific store-swapped-partial variant.

In some embodiments, the second partial-vector-sized datum is stored via the load-store path.

In some embodiments, where the store-swapped-partial instruction is a store-swapped-leading-partial instruction, storing the second partial-vector-sized datum to the destination address involves storing a whole partial-vector-sized datum to the destination address if the destination address is naturally aligned. However, if the destination address is unaligned, storing the second partial-vector-sized datum to the destination address may involve storing a portion of the second partial-vector-sized datum to the destination address.

In some embodiments, where the store-swapped-partial instruction is a store-swapped-trailing-partial instruction, storing the second partial-vector-sized datum to the destination address involves storing nothing to the destination address if the destination address is aligned with memory. However, if the destination address is unaligned, storing the second partial-vector-sized datum to the destination address may involve storing a portion of the second partial-vector-sized datum to the destination address.

In some embodiments, the store-swapped-partial instruction rotates bytes of the second partial-vector-sized datum N positions in a direction determined by the endian-ness of the memory transaction. Note that N is equivalent to the destination address specified by the instruction modulo the second partial-vector-sized datum length in bytes. Furthermore, the second partial-vector-sized datum is rotated to the left N byte positions for a big-endian memory transaction, or the second partial-vector-sized datum is rotated to the right N byte positions in the case of little-endian memory transactions.

In some embodiments, the store-swapped-partial instruction rotates bytes of the second partial-vector-sized datum as the second partial-vector-sized datum passes through the load-store path.

In another embodiment of the present invention the processor is configured to execute load-swapped-control-vector-partial instructions. In doing so, the instruction fetch unit within the processor is configured to fetch the load-swapped-control-vector-partial instruction to be executed. Note that the load-swapped-control-vector-partial instruction specifies a target address in the memory, which is possibly an unaligned address. Furthermore, the execution unit within the processor is configured to execute the load-swapped-control-vector-partial instruction. This involves determining a value N, wherein N is the specified target address modulo a length in bytes of a third partial-vector-sized datum, and constructing a control vector where N elements in the control vector are set to a given polarity, and the remaining elements of the vector are set to the opposite polarity.

In some embodiments, the N elements in the control vector are the N most-significant elements in the partial-vector-sized datum. However, in other embodiments the N elements in the control vector are the N least-significant elements in the partial-vector-sized datum.

Another embodiment of the invention provides a computer system that includes the processor and the memory. The computer system is configured to execute the load-swapped-partial instruction, the store-swapped-partial instruction, and/or the load-swapped-control-vector-partial instruction.

Figure 1A:
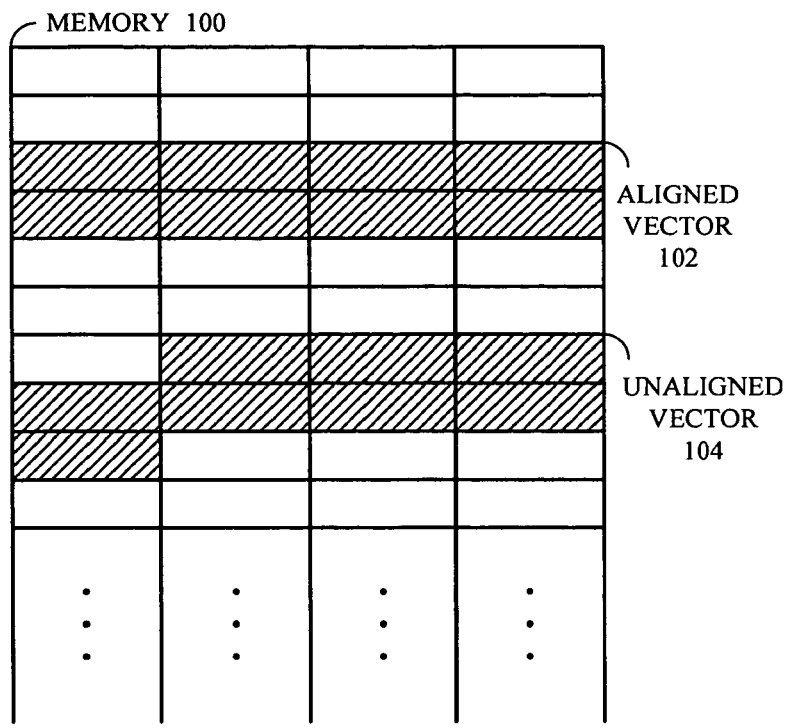
FIG. 1A is a block diagram illustrating a memory.
Figure 1B:
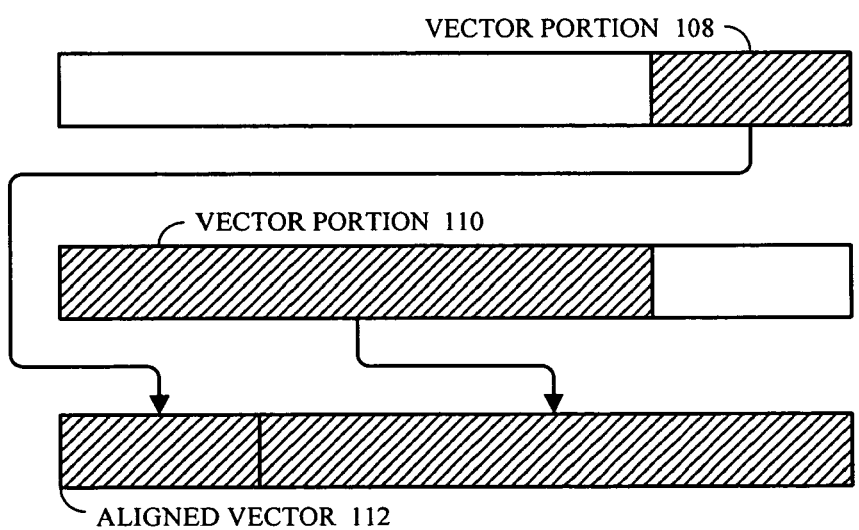
FIG. 1B is a block diagram illustrating an alignment process.

Table 1 provides exemplary code for a vector-move operation in accordance with an embodiment of the present invention.

Table 2 provides exemplary code for a vector-move operation in which an aligned vector is never constructed in accordance with an embodiment of the present invention.

Table 3 provides exemplary code for a partial-vector-move operation in accordance with an embodiment of the present invention.

Table 4 provides exemplary code for a partial-vector-move operation in which an aligned vector is never constructed in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Computer System

Figure 2A:
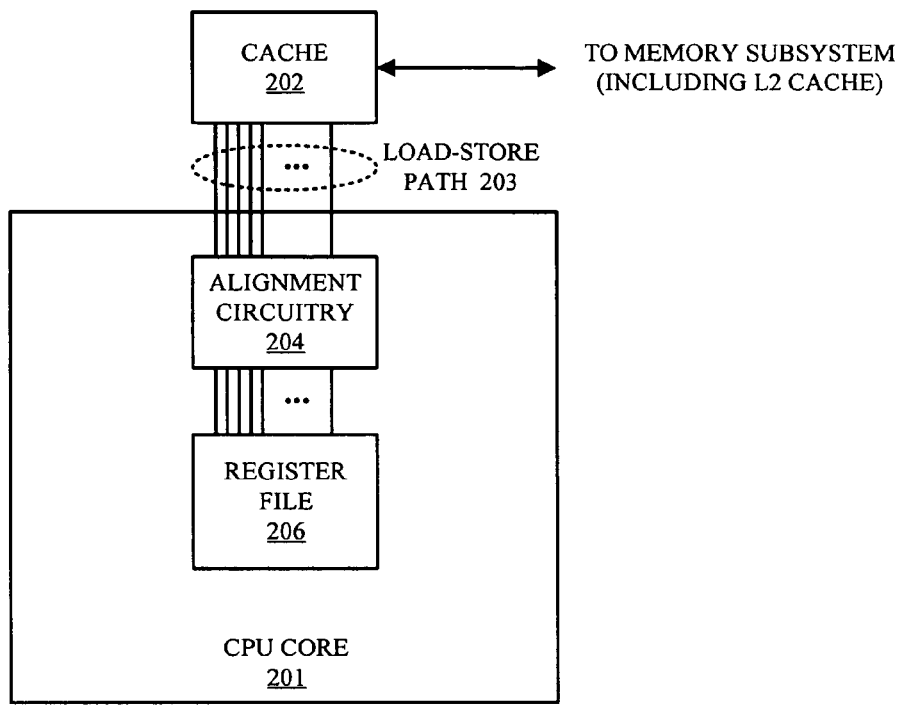
FIG. 2A is a block diagram illustrating a computer system in accordance with an embodiment of the present invention.

FIG. 2A presents a block diagram of a computer system 200 in accordance with an embodiment of the present invention. Computer system 200 can generally include any type of computer system, including, but not limited to, a computer system based on a microprocessor, a mainframe computer, a digital signal processor, a portable computing device, a personal organizer, a device controller, a cell phone or a computational engine within an appliance.

Computer system 200 includes a central-processing unit (CPU) core 201 which performs computational operations. While performing these computational operations, CPU core 201 operates on data items retrieved from cache memory 202, which is coupled to a memory subsystem (not illustrated). In one embodiment of the present invention, cache memory 202 is a Level-One (L1) data cache which communicates with a memory subsystem that includes a Level-Two (L2) unified instruction/data cache and a main memory.

CPU core 201 includes a register file 206 which holds operands which are processed by functional units within CPU core 201.

CPU core 201 additionally includes alignment circuitry 204 which is located along a load-store path 203 between cache memory 202 and register file 206. This alignment circuitry 204 performs "byte-swapping operations" to facilitate performing "load-swapped" instructions (which are referred to as load-partial instructions and/or load-swapped-partial instructions) and "store-swapped" instructions (which are referred to as store-partial instructions and/or store-swapped-partial instructions), which are described in more detail below.

Figure 2B:
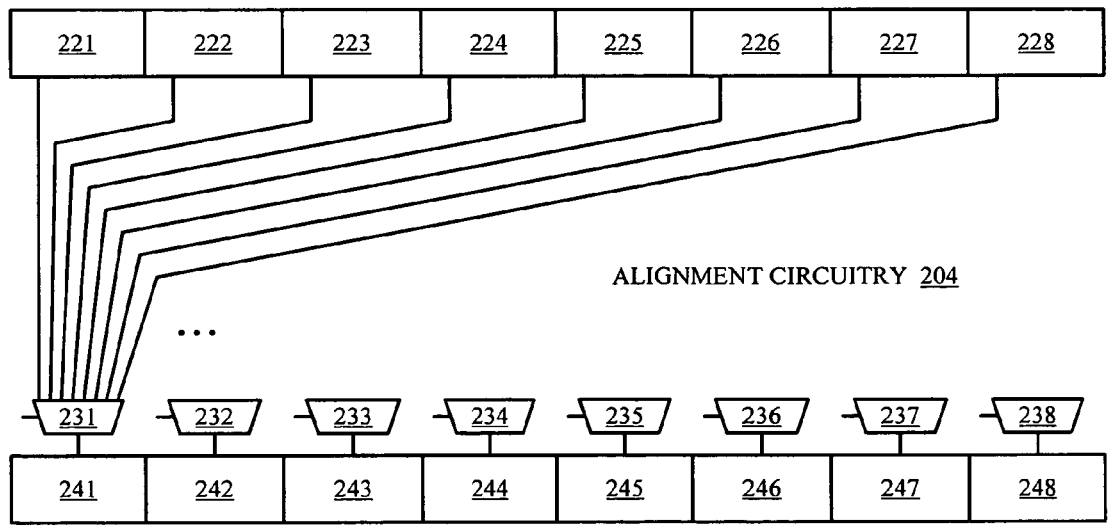
FIG. 2B is a block diagram illustrating alignment circuitry in accordance with an embodiment of the present invention.

As illustrated in FIG. 2B, in one embodiment of the present invention the alignment circuitry 204 includes a number of multiplexers 231-238. During operation, the alignment circuitry 204 illustrated in FIG. 2B receives a number of bytes 221-228 on load-store path 203 (FIG. 2a) and then swaps the bytes using multiplexers 231-238 to form a swapped set of bytes 241-248. This swapping process is also described in more detail below.

Note that while the computer system 200 (FIG. 2A) and the alignment circuitry 204 are illustrated as having a number of components in a given configuration, in other embodiments the computer system 200 (FIG. 2A) and the alignment circuitry 204 may include fewer components or additional components, two or more components may be combined into a single component, and/or a position of one or more components may be changed.

The Load-Swapped-Control-Vector Instruction

Figure 3:
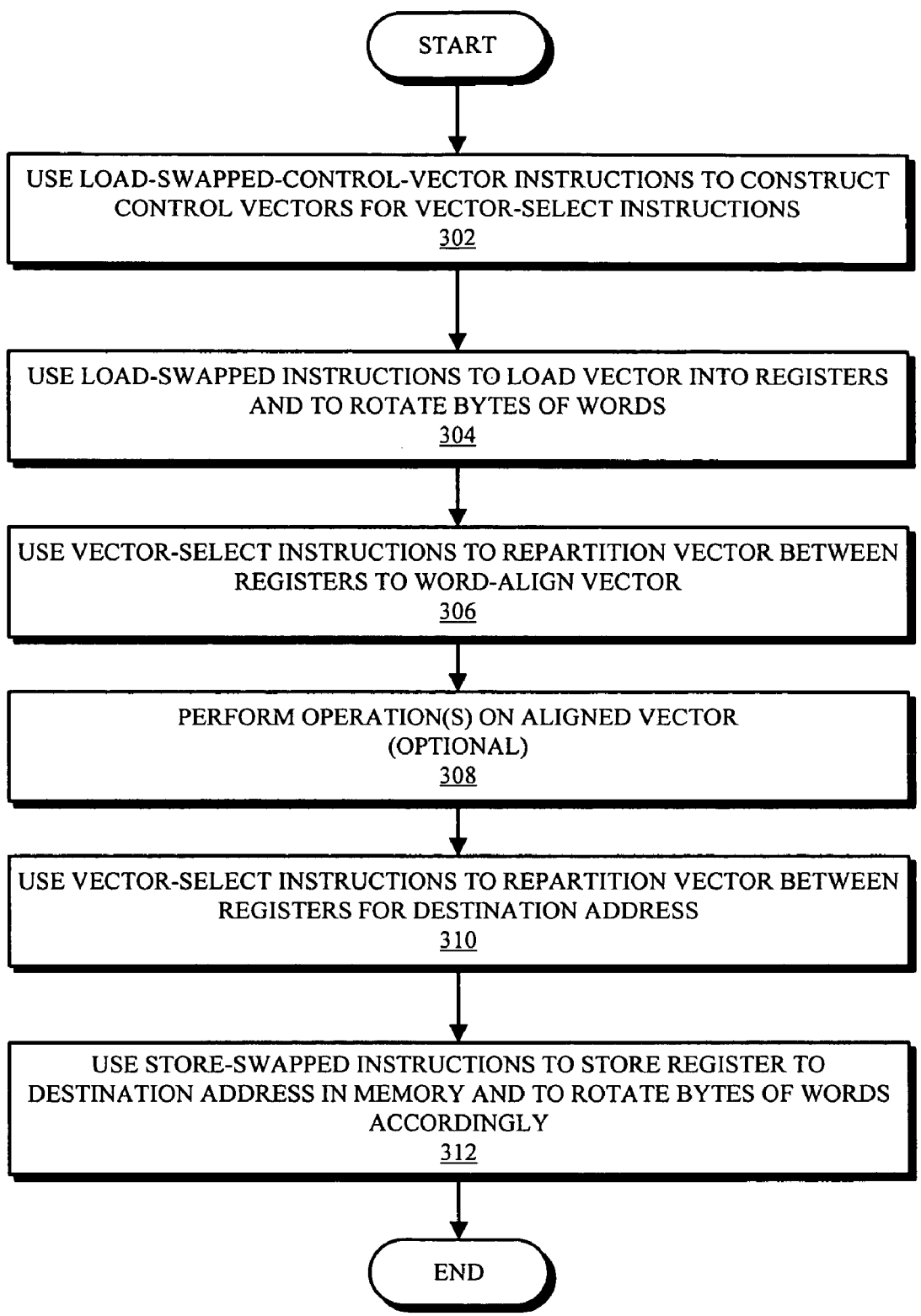
FIG. 3 is a flow chart illustrating a process for moving an unaligned vector in accordance with an embodiment of the present invention.

FIG. 3 presents a flow chart illustrating a process for moving an unaligned vector in accordance with an embodiment of the present invention. During this process, the system uses a load-swapped-control-vector instruction to construct a control vector containing predicate elements to control the vector-select instructions (302).

Upon receiving the load-swapped-control-vector instruction along with a target address (such as source address or a destination address) of arbitrary alignment, the processor takes the target address and computes a control vector of predicate elements (true/false) based on the target address, and then stores this control vector in a register. The instruction evaluates the target address with respect to the naturally aligned address less than or equal to the target address and the difference between the target address and the naturally aligned address (N) is used to set the predicate elements. On a little-endian processor, predicate elements corresponding to the N least significant bytes of the control vector are set to a given polarity, and predicate elements corresponding to the remaining bytes of the control vector are set to the opposite polarity. On a big-endian processor, predicate elements corresponding to the N most significant bytes of the control vector are set to a given polarity, and predicate elements corresponding to the remaining bytes of the control vector are set to the opposite polarity. This control vector may be used by subsequent "vector-select" instructions or logical operations to merge individual bytes from multiple vectors into a single result vector.

The Load-Swapped Instruction

The load-swapped instruction is used to load a vector into registers (304). Upon receiving a load-swapped instruction, the processor loads a vector encompassing the source address from a naturally-aligned memory address into a register and in doing so rotates bytes of the vector, so that the byte at the source address resides in the least significant byte position of the register on a little-endian processor, or in the most-significant byte position in the vector for a big-endian processor. More specifically, the load-swapped instruction takes a source address of arbitrary alignment and loads a vector-sized datum from the nearest naturally aligned address that is less-than-or-equal-to the source address provided, i.e., naturally_aligned_address=(source_address−N); where
N=(source_address mod vector_length_in_bytes).

During the Load-Swapped operation, the processor hardware rotates bytes through the vector to affect a possible transformation: on a little-endian processor, bytes are rotated to the right N positions, while on a big-endian processor, bytes are rotated left N positions. Equivalently, bytes may be rotated in the opposite direction by (vector_length_in_bytes−N) positions. These transformations are functionally equivalent to swapping data such that the bytes residing at addresses lower than the source address are swapped, as a set, with the set of bytes residing at addresses greater than or equal to the source address.

The system may optionally employ vector-select instructions to repartition the vector between the registers to create a vector containing the data from the possibly unaligned address above. Note that each vector-select instruction selects between bytes of input registers containing the vector (306) using a control vector. The system may then optionally perform one or more operations on the vector (308).

Furthermore, the system may then optionally employ vector-select instructions to repartition the vector between the registers in a manner which is consistent with using a later store-swapped instruction to store the vector to a memory address or arbitrary alignment. Note that each vector-select instruction selects between bytes of input registers containing the vector (310).

The Store-Swapped Instruction

The store-swapped instruction is used to store a vector register containing the vector to the destination address. Note that each store-swapped instruction stores a whole vector from a register into memory and in doing so rotates bytes of the vector, so that the least significant byte of the vector is stored to the destination address on a little-endian processor, or so that the most-significant byte of the vector is stored to the destination address on in a big-endian processor (312). More specifically, upon receiving a store-swapped instruction, the processor takes a vector register, and a destination address of arbitrary alignment, and stores the vector from the register into the nearest naturally-aligned memory address less than or equal to the destination address, i.e., naturally_aligned_address=(destination_address−N);

where

N=(destination_address mod vector_length_in_bytes).

During the store-swapped operation, the processor hardware rotates bytes through the vector to affect a possible transformation: on a little-endian processor, bytes are rotated to the left N positions, while on a big-endian processor, bytes are rotated right N positions. Equivalently, bytes may be rotated in the opposite direction by (vector_length_in_bytes−N) positions. These transformations are functionally equivalent to swapping data such that the bytes residing at addresses lower than the source address are swapped, as a set, with the set of bytes residing at addresses greater than or equal to the source address.

If the destination address is unaligned, a "store-swapped-leading instruction" and a "store-swapped-trailing instruction" can be used to store partial vectors at the beginning and the end of a range of consecutive vectors.

Upon receiving a store-swapped-leading instruction, the processor stores a partial vector, swapped in the manner described above, to the destination address. The amount of data stored is dependent upon the destination address. Data is stored into the memory ranging from the destination address until one-byte before the next naturally aligned address boundary, inclusive (N-bytes). On a little-endian processor, the N least-significant bytes of the vector are stored. On a big-endian processor, the N most-significant bytes of the vector are stored to the destination address.

Similarly, upon receiving a store-swapped-trailing instruction, the processor stores a partial vector swapped in the manner described above, to the nearest naturally aligned address less than or equal to the destination address. The amount of data stored is dependent upon the destination address. Data is stored into the memory ranging from the nearest naturally-aligned address which is less than or equal to the destination address until one-byte before the destination address, inclusive (N-bytes). On a little-endian processor, the N most-significant bytes of the vector are stored. On a big-endian processor, the N least-significant bytes of the vector are stored to the nearest naturally aligned address less than or equal to the destination address. The processor may optionally store no data if the destination address is naturally aligned.

As described further below, note that the above-described embodiment of the present invention can leverage existing hardware found in most processors for reading-from and writing-to the data cache(s). Such circuits exist to load data types shorter than the length of a cache-line, which is the typical case for all data types of a given processor. Moreover, since the load-swapped and store-swapped instructions only read/write data corresponding to a single naturally aligned address, there is no need to correlate multiple memory-read accesses in hardware. Also note that in some embodiments of the process there may be additional or fewer operations, an order of the operations may be changed, and/or two or more operations may be combined into a single operation.

TABLE 1

R = Load_Swapped_Control_Vector(source_ptr);
W = Load_Swapped_Control_Vector(dest_ptr);
A = Load_Swapped(source_ptr++);

TABLE 1-continued

B = Load_Swapped(source_ptr++);
C = Load_Swapped(source_ptr++) ;
if (unaligned)
    D = LoadSwapped(source_ptr++)
J = Vector_Select(R,A,B); // compose vectors from swapped data
    K = Vector_Select(R,B,C);
L = Vector_Select(R,C,D);
// J, K, and L are 3 consecutive vectors of data from an unaligned source address
M = Vector_Select(W,K,J); // decompose into swapped vectors
N = Vector_Select(W,L,K);
Store_Swapped_Leading(J,dest_ptr++);
Store_Swapped(M,dest_ptr++);
Store_Swapped(N,dest_ptr++);
if (unaligned)
    Store_Swapped_Trailing(L,dest_ptr);

Example

Figure 4:
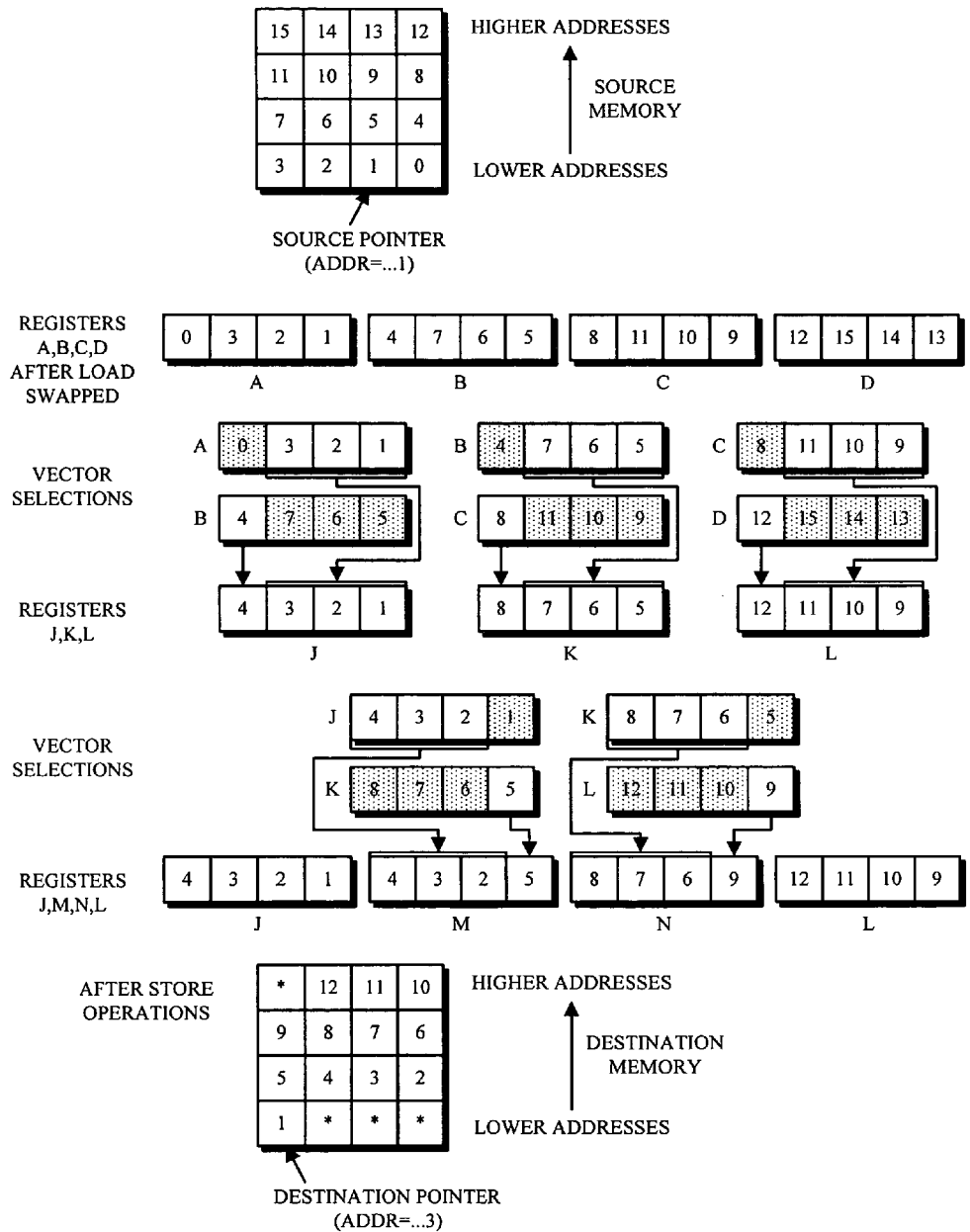
FIG. 4 illustrates an exemplary vector-move operation in accordance with an embodiment of the present invention.

Table 1 illustrates how alignment-agnostic vector code can be written to perform a vector-move operation in accordance with an embodiment of the present invention. This example performs a vector-move operation for arbitrarily-aligned source and destination pointers on a little-endian processor. Note that in this example, there are two vector-select operations per move. (FIG. 4 graphically illustrates the how the move operation is accomplished.)

Example which does not Construct an Aligned Vector

Figure 5:
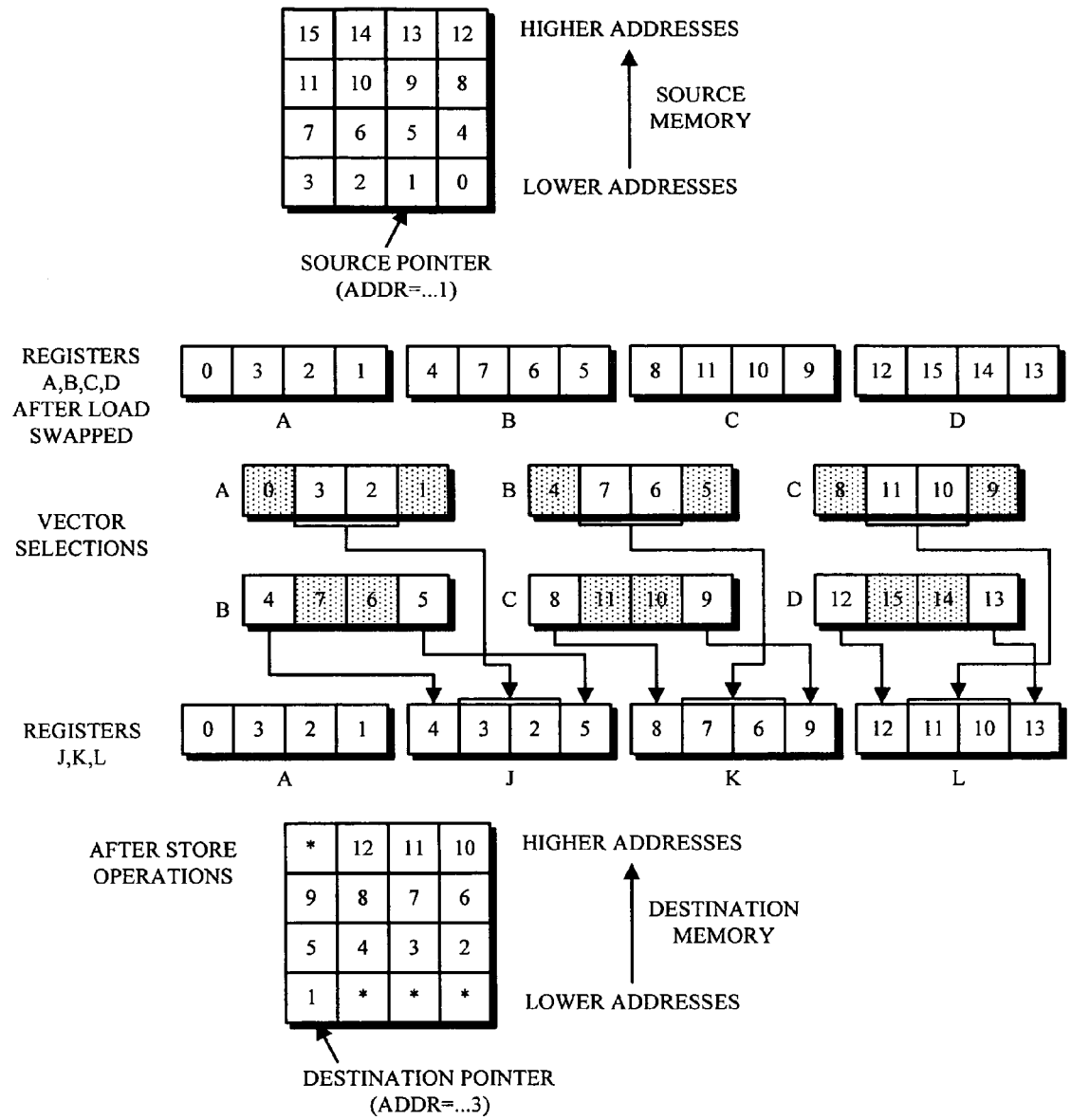
FIG. 5 illustrates an exemplary vector-move operation in which an aligned vector is never constructed in accordance with an embodiment of the present invention.

Table 2 illustrates how alignment-agnostic vector code can be written to perform a vector-move operation in which an aligned vector is never constructed in accordance with an embodiment of the present invention. This example similarly performs a data-move operation for arbitrarily-aligned source and destination pointers on a little-endian processor. However, in this example, only a single vector-select operation is performed at the cost of never forming a proper vector in the processor registers. Because a proper vector is never formed in the registers, the system can only perform at limited set of operations on the vector during the moving process. More specifically, the system can only perform operations on the vector which do not require interactions between different byte positions in the vector (FIG. 5 graphically illustrates the how this move operation is accomplished.)

TABLE 2

R = Load_Swapped_Control_Vector(source_ptr);
W = Load_Swapped_Control_Vector(dest_ptr);
X = R ^ W;
A = Load_Swapped(source_ptr++);
B = Load_Swapped(source_ptr++);
C = Load_Swapped(source_ptr++);
D = Load_Swapped(source_ptr++);
J = Vector_Select(X,B,A);
K = Vector_Select(X,C,B);
L = Vector_Select(X,D,C);
Store_Swapped_Leading(A,dest_ptr++);
StoreSwapped(J,dest_ptr++);
StoreSwapped(K,dest_ptr++);
Store_Swapped_Trailing(L,dest_ptr);

The Load-Swapped-Control-Vector-Partial Instruction

Modified versions of the previously described techniques may also be applied to partial vectors or partial-vector-sized datums, which may be aligned or unaligned. For example, a portion of a vector may be loaded from or stored to cache memory in chunks. This may be useful when the number of bits in a full vector register (i.e., the full width of the register) is larger than number of bits or bandwidth of the load-store path coupling cache memory and the register (i.e., the width of the load/store path). In particular, by using load-swapped-partial and store-swapped-partial instructions described below, it may not be necessary to correlate multiple memory-read accesses in hardware.

Figure 6:
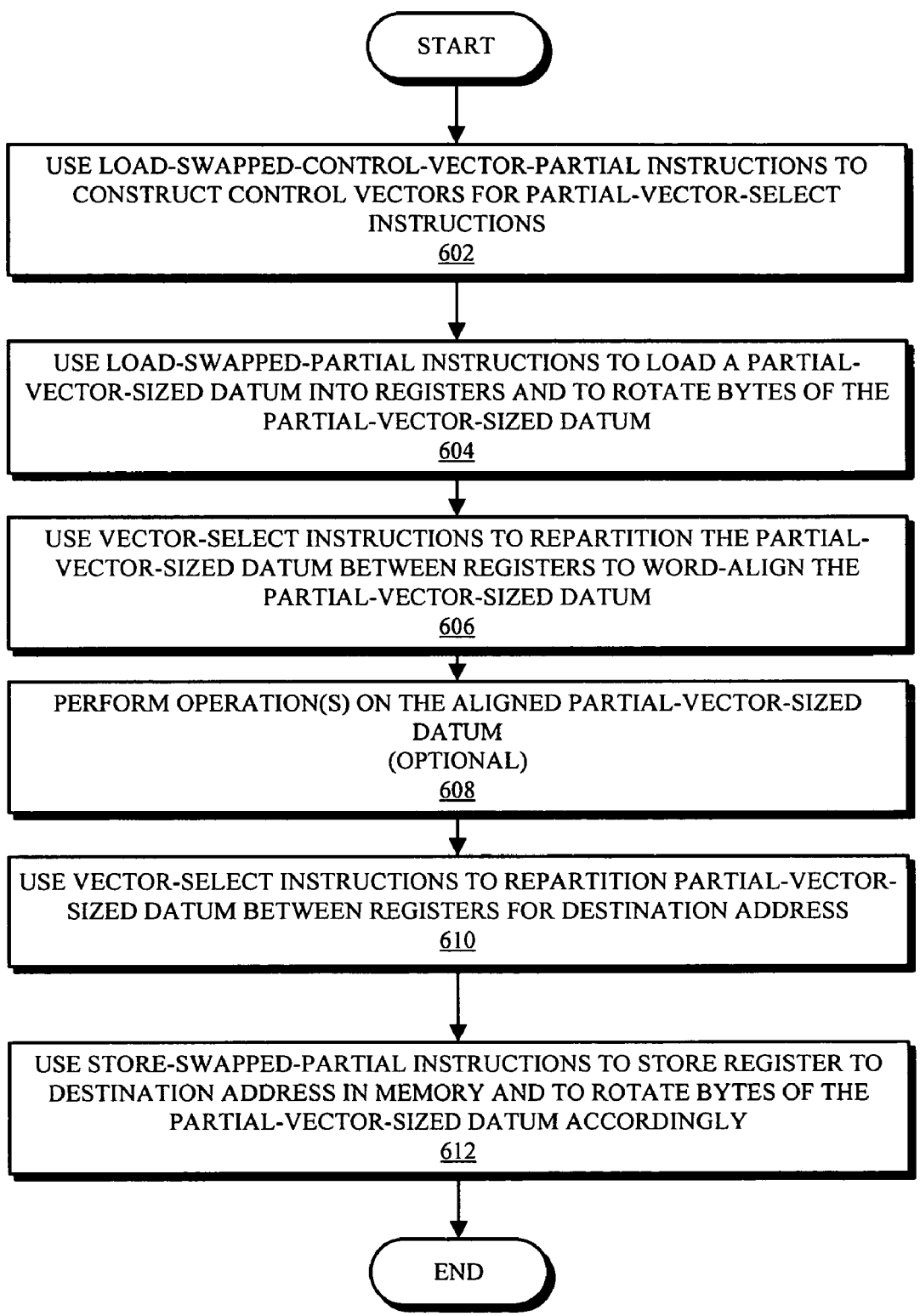
FIG. 6 is a flow chart illustrating a process for moving an unaligned partial vector in accordance with an embodiment of the present invention.

FIG. 6 presents a flow chart illustrating a process for moving an unaligned partial vector or partial-vector-sized datum in accordance with an embodiment of the present invention. During this process, the system first uses a load-swapped-control-vector-partial instruction to construct a control vector containing predicate elements to control the vector-select instructions (602).

Upon receiving the load-swapped-control-partial vector instruction along with a target address (such as a source address or a destination address) of arbitrary alignment, the processor takes the target address and computes a control vector of predicate elements (true/false) based on the target address, and then stores this control vector in a register. Note that the process may use the control vector and subsequent instructions to merge individual bytes from multiple vectors into a single result vector.

Note that the target address modulo the partial-vector length in bytes (denoted as N) and the length in bytes of the partial-vector-sized datum divisible evenly into the vector size in bytes (denoted as M) are used to set the predicate elements. On a little-endian processor, predicate elements corresponding to the N most-significant bytes of the control vector are set to a given polarity and the remainder elements (modulo M) are set to the opposite polarity. This pattern is repeated while inverting the polarity of the predicate elements over the remainder of the full vector size. On a big-endian processor, predicate elements corresponding to the N least-significant bytes of the control vector are set to a given polarity and the remainder elements (modulo M) are set to the opposite polarity. Once again, this pattern is repeated while inverting the polarity of the predicate elements over the remainder of the full vector size.

The Load-Swapped-Partial Instruction

The load-swapped-partial instruction is used to load a partial-vector-sized datum into registers (604). Upon receiving a load-swapped-partial instruction, the processor loads a partial-vector-sized datum encompassing the source address from a naturally-aligned memory address into a register and in doing so rotates bytes of the partial-vector-sized datum. In particular, the byte at the source address resides in the least significant byte position of the register on a little-endian processor, or in the most-significant byte position in the register for a big-endian processor. More specifically, the load-swapped-partial instruction takes a source address of arbitrary alignment and loads a partial-vector-sized datum from the nearest naturally aligned address that is less-than-or-equal-to the source address provided, i.e., naturally_aligned_address=(source_address−N); where N=(source_address mod partial_vector_length_in_bytes).

During the Load-Swapped-Partial operation, the processor hardware rotates bytes through the partial-vector-sized datum to affect a possible transformation: on a little-endian processor, bytes are rotated to the right N positions until the byte at the source address comes to the least-significant end of the partial-vector-sized datum, while on a big-endian processor, bytes are rotated left N positions until the byte at the source address comes to the most-significant end of the partial-vector-sized datum. The remaining bytes of the full vector are unaffected by this operation. Equivalently, bytes may be rotated in the opposite direction by (vector_length_in_bytes−N) positions. These transformations are functionally equivalent to swapping data such that the bytes residing at addresses lower than the source address are swapped, as a set, with the set of bytes residing at addresses greater than or equal to the source address.

The system may optionally employ vector-select instructions to repartition the partial-vector-sized datum between the registers to create a vector containing the data from the possibly unaligned address above. Note that each vector-select instruction may select between bytes of input registers containing the partial-vector-sized datum (606) using a control vector. The system may then optionally perform one or more operations on the partial-vector-sized datum (608).

Furthermore, the system may then optionally employ vector-select instructions to repartition the partial-vector-sized datum between the registers in a manner which is consistent with using a later store-swapped-partial instruction to store the partial-vector-sized datum to a memory address of arbitrary alignment. Note that each vector-select instruction may select between bytes of input registers containing the partial-vector-sized datum (610).

Note that the Load-Swapped-Partial operation has a number of variations, such as a load-swapped-partial-and-shift instruction, a load-swapped-partial-after-swap instruction, and/or a load-swapped-partial-and-duplicate instruction. In the load-swapped-partial-and-shift instruction rather than overwriting the partial-vector-sized datum in the vector register with the data being loaded, at least the partial-vector-sized datum is relocated to another part of the register. In the load-swapped-partial-after instruction, the high and low partial-vector-sized datums are swapped before the load, sparing the data that would have otherwise been overwritten by the load. And in the load-swapped-partial-and-duplicate instruction, the partial-vector-sized datum is duplicated across the entire vector register.

The Store-Swapped-Partial Instruction

The store-swapped-partial instruction is used to store a vector register containing the partial-vector-sized datum to the destination address. Note that each store-swapped-partial instruction may store the partial-vector-sized datum from a register into memory and in doing so rotates bytes of the partial-vector-sized datum, so that the least significant byte of the partial-vector-sized datum is stored to the destination address on a little-endian processor, or so that the most-significant byte of the partial-vector-sized datum is stored to the destination address on in a big-endian processor (612). More specifically, upon receiving a store-swapped-partial instruction, the processor takes a vector register, and a destination address of arbitrary alignment, and stores the partial-vector-sized datum from the register into the nearest naturally-aligned memory address less than or equal to the destination address, i.e., naturally_aligned_address=(destination_address−N); where N=(destination_address mod partial_vector_length_in_bytes).

During the store-swapped operation, the processor hardware rotates bytes through the partial-vector-sized datum to affect a possible transformation: on a little-endian processor, bytes are rotated to the left N positions until the least-significant byte is stored to the destination address, while on a big-endian processor, bytes are rotated right N positions until the most-significant byte is stored to the destination address. Equivalently, bytes may be rotated in the opposite direction by (vector_length_in_bytes−N) positions. These transformations are functionally equivalent to swapping data such that the bytes residing at addresses lower than the destination address are swapped, as a set, with the set of bytes residing at addresses greater than or equal to the destination address.

If the destination address is unaligned, a "store-swapped-partial-leading instruction" and a "store-swapped-partial-trailing instruction" may be used to store partial-vector-sized datums at the beginning and the end of a range of consecutive vectors.

Upon receiving a store-swapped-partial-leading instruction, the processor stores a partial-vector-sized datum, swapped in the manner described above, to the destination address. The amount of data stored is dependent upon the destination address and the size of the partial-vector-sized datum. Data is stored into the memory ranging from the destination address until one-byte before the next naturally aligned address boundary, inclusive (N-bytes). On a little-endian processor, the N least-significant bytes of the partial-vector-sized datum are stored, and on a big-endian processor the N most-significant bytes of the partial-vector-sized datum are stored to the destination address. Note that the processor may optionally not store the entire partial-vector-sized datum if the destination address is naturally aligned.

Similarly, upon receiving a store-swapped-partial-trailing instruction, the processor stores a partial-vector-sized datum swapped in the manner described above, to the nearest naturally aligned address less than or equal to the destination address. The amount of data stored is dependent upon the destination address and the size of the partial-vector-sized datum. Data is stored into the memory ranging from the nearest naturally-aligned address which is less than or equal to the destination address until one-byte before the destination address, inclusive (N-bytes). On a little-endian processor, the N most-significant bytes of the partial-vector-sized datum are stored, and on a big-endian processor the N least-significant bytes of the partial-vector-sized datum are stored to the nearest naturally aligned address less than or equal to the destination address. Note that the processor may optionally store no data if the destination address is naturally aligned. Alternatively, the processor may rely on software not to execute this instruction for aligned addresses.

Note that in some embodiments of the process there may be additional or fewer operations, an order of the operations may be changed, and/or two or more operations may be combined into a single operation.

TABLE 3

LoadSwapCtlP = Load Control Vector for Partial Swapped;
LoadSwapPS = Load-Swapped-Partial-After-Swap;
LoadSwapPD = Load-Swapped-Partial-Duplicate;
StoreSwapP = Store-Swapped-Partial;
StoreSwapLeadP = Store-Swapped-Partial-Leading;
StoreSwapTrailP = Store-Swapped-Partial-Trailing;
SwapHighLow = Swap high and low halves (parts) of vector;
VecSelect = Select Bytes From Two Vectors Based on Predicates;
ld = LoadSwapCtlP (LoadAddress);
st = LoadSwapCtlP (StoreAddress);
a = LoadSwapPS (a, LoadAddress + PartSize * 0);
b = LoadSwapPD (LoadAddress + PartSize * 1);
a = LoadSwapPS (a, LoadAddress + PartSize * 2);
e = VecSelect (ld, a, b);
d = LoadSwapPD (LoadAddress + PartSize * 3);
c = LoadSwapPS (a, LoadAddress + PartSize * 4);
f = VecSelect (ld, c, d);
(Optional Processing)
StoreSwapLeadP (e, StoreAddress + PartSize * 0);
temp1 = SwapHighLow(e);
g = VecSelect(st, temp1, e);
StoreSwapP (g, StoreAddress + PartSize * 1);
h = VecSelect(st, f, temp1);
StoreSwapP (h, StoreAddress + PartSize * 2);
temp2 = SwapHighLow(f);

TABLE 3-continued i = VecSelect(st, temp2, f);
StoreSwapP (i, StoreAddress + PartSize * 3);
StoreSwapTrailP (temp2, StoreAddress + PartSize * 4);

Example

Figure 7A:
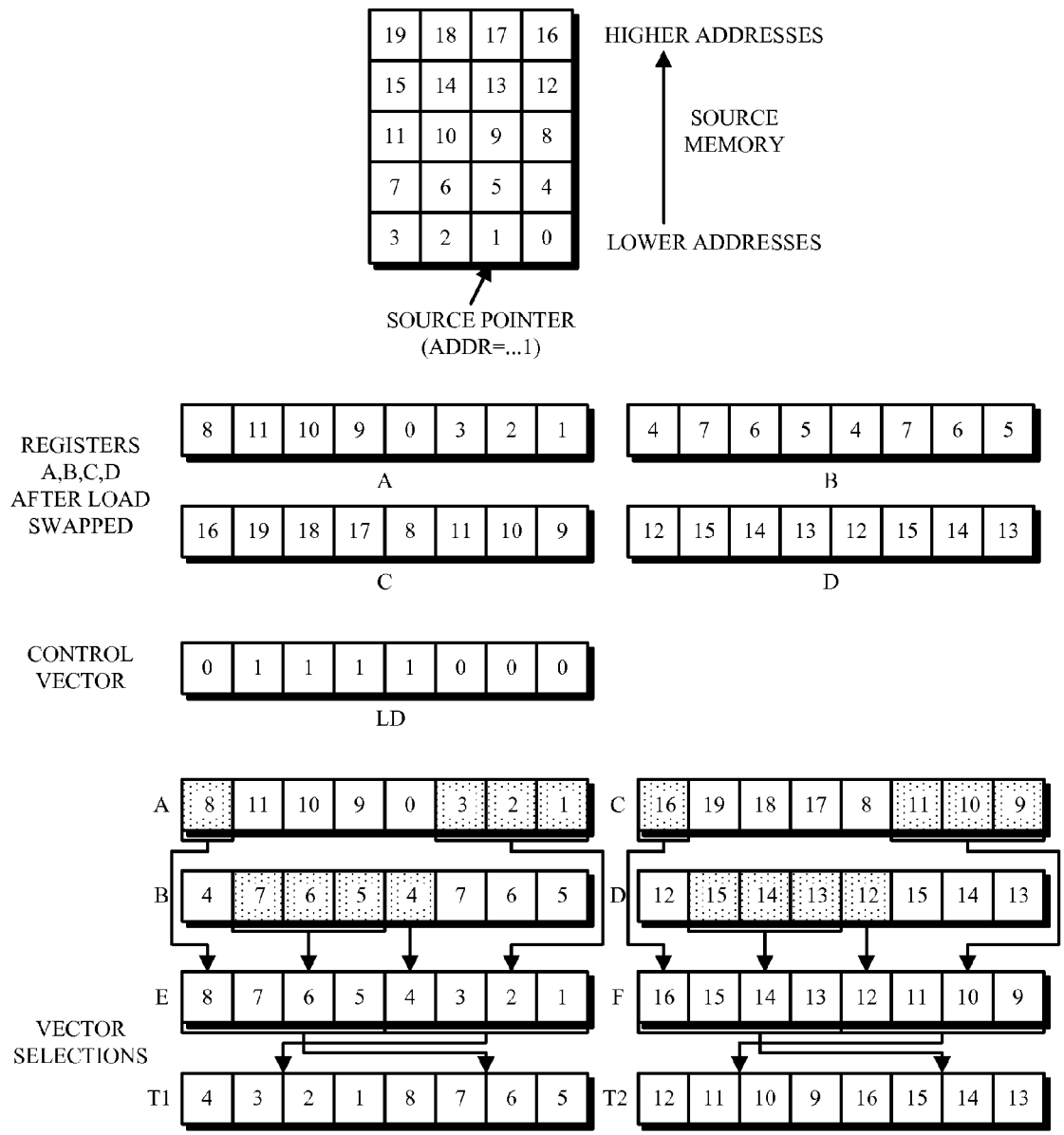
FIG. 7A illustrates an exemplary partial-vector-move operation in accordance with an embodiment of the present invention.
Figure 7B:
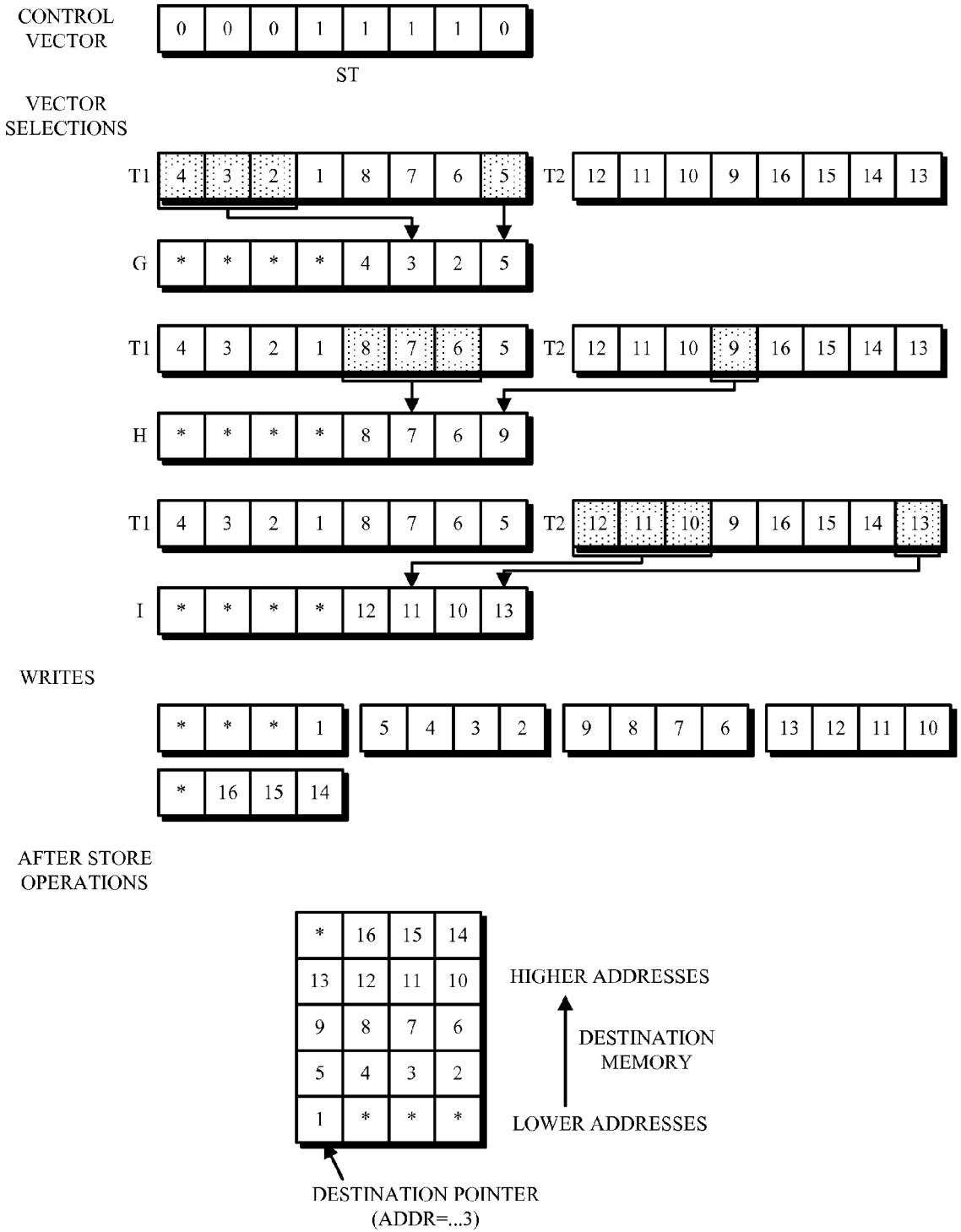
FIG. 7B illustrates an exemplary partial-vector-move operation in accordance with an embodiment of the present invention.

Table 3 illustrates how vector code can be written to perform a partial-vector-move operation in accordance with an embodiment of the present invention. This example loads a partial-vector-sized datum from an unaligned address, processes the partial-vector-sized datum, and writes the partial-vector-sized datum to another unaligned address on a little-endian processor. Note that in this example, there are two vector-select operations per move. (FIGS. 7A and 7B graphically illustrate the how the move operation is accomplished.)

Example which does not Construct an Aligned Vector

Figure 8A:
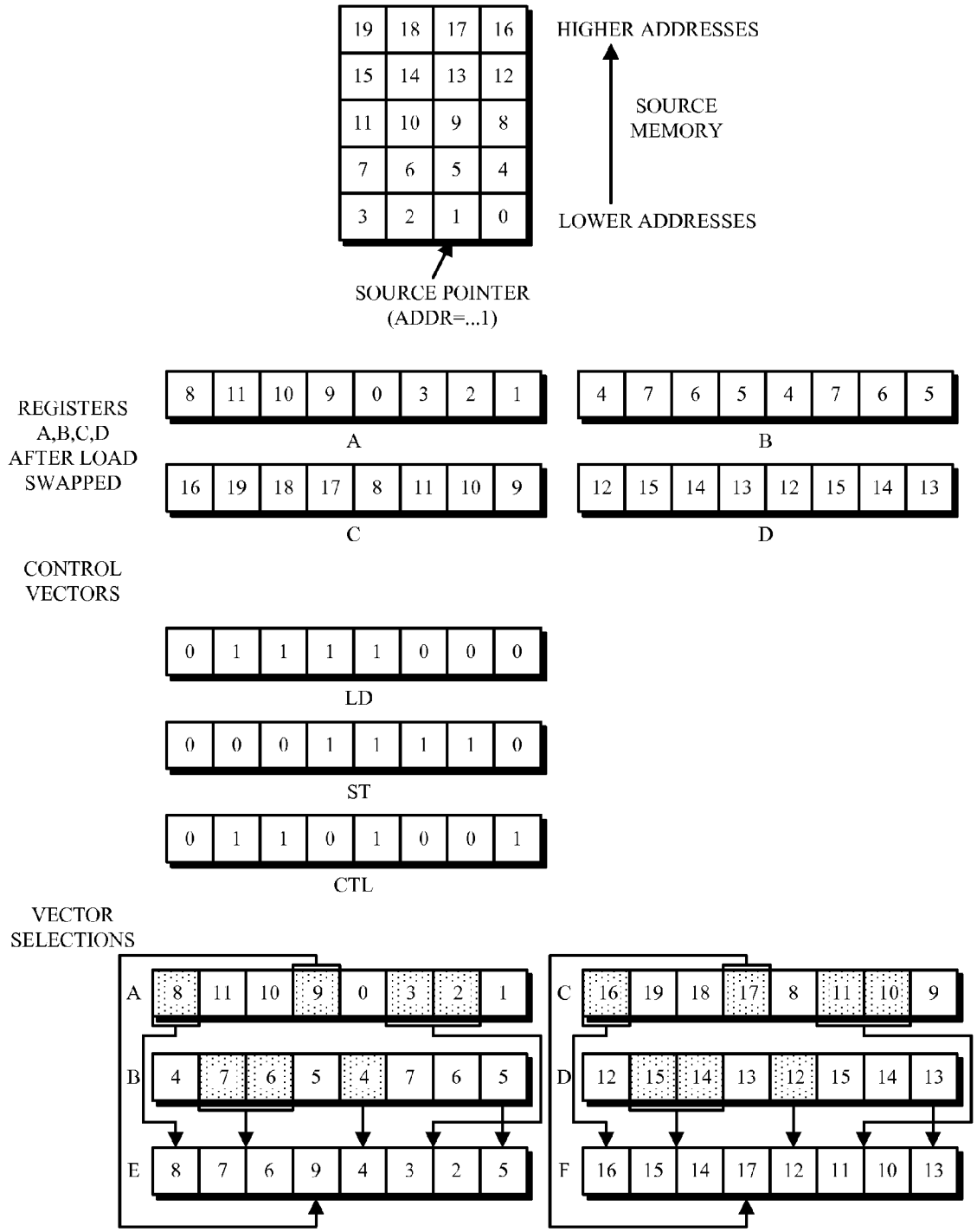
FIG. 8A illustrates an exemplary partial-vector-move operation in which an aligned vector is never constructed in accordance with an embodiment of the present invention.
Figure 8B:
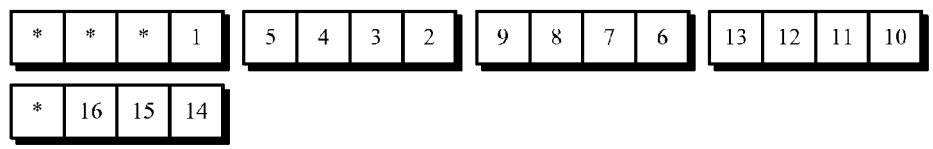
FIG. 8B illustrates an exemplary partial-vector-move operation in which an aligned vector is never constructed in accordance with an embodiment of the present invention.
Figure 8B:
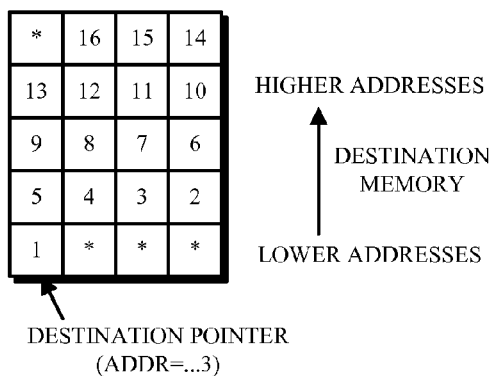

Table 4 illustrates how vector code can be written to perform a partial-vector-move operation in which an aligned vector is never constructed in accordance with an embodiment of the present invention. This example similarly performs a partial-vector-move operation for arbitrarily-aligned source and destination pointers on a little-endian processor. However, in this example a proper vector is never formed in the processor registers. As a consequence, the system can only perform at limited set of operations on the partial-vector-sized datum during the moving process. More specifically, the system can only perform operations on the partial-vector-sized datum that do not require interactions between different byte positions in the partial-vector-sized datum (FIGS. 8A and 8B graphically illustrates the how this move operation is accomplished.)

TABLE 4

LoadSwapCtlP = Load Control Vector for Partial Swapped;
LoadSwapPS = Load-Swapped-Partial-After-Swap;
LoadSwapPD = Load-Swapped-Partial-Duplicate;
StoreSwapP = Store-Swapped-Partial;
StoreSwapLeadP = Store-Swapped-Partial-Leading;
SwapHighLow = Swap high and low halves (parts) of vector;
VecSelect = Select Bytes From Two Vectors Based on Predicates;
XORInvertPart = XOR vectors, inverting polarity of a partial vector;
ld = LoadSwapCtlP (LoadAddress);
st = LoadSwapCtlP (StoreAddress);
ctl = XorInvertPart (ld, st);
temp = LoadSwapPS (temp, LoadAddress + PartSize * 0);
b = LoadSwapPD (LoadAddress + PartSize * 1);
a = LoadSwapPS (temp, LoadAddress + PartSize * 2);
d = LoadSwapPD (LoadAddress + PartSize * 3);
c = LoadSwapPS (a, LoadAddress + PartSize * 4);
e = VecSelect (ctl, a, b);
f = VecSelect (ctl, c, d);
StoreSwapLeadP (a, StoreAddress + PartSize * 0);
StoreSwapP (e, StoreAddress + PartSize * 1);
temp1 = SwapHighLow(e);
StoreSwapP (temp1, StoreAddress + PartSize * 2);
StoreSwapP (f, StoreAddress + PartSize * 3);
temp2 = SwapHighLow(f);
StoreSwapP (temp2, StoreAddress + PartSize * 4);

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing a load-partial instruction, comprising:

receiving the load-partial instruction to be executed, wherein the load-partial instruction specifies a source address in memory, which is arbitrarily aligned; and executing the load-partial instruction, which involves loading a partial-vector-sized datum from a naturally-aligned memory region encompassing the source address into a register, and in doing so, if the source address is unaligned, rotating the bytes of the partial-vector-sized datum by swapping a set of bytes residing at addresses lower than the source address with a set of bytes residing at addresses greater than or equal to the source address, wherein rotating the bytes of the vector involves rotating the bytes N positions, wherein N is equivalent to either the source address specified by the instruction modulo the vector length in bytes or the source address specified by the instruction modulo the vector length in bytes subtracted from the vector length in bytes, wherein rotating the bytes of the partial-vector-sized datum occurs before the partial-vector-sized datum reaches the register, and wherein rotating the bytes of the partial-vector-sized datum involves using alignment circuitry which is located along a load-store path between the memory and the register to cause the byte at the specified source address to reside at the least-significant byte position within the partial-vector-sized datum for a little-endian memory transaction, or to cause the byte to be positioned at the most-significant byte position within the partial-vector-sized datum for a big-endian memory transaction.

2. The method of claim 1, wherein the partial-vector-sized datum is loaded via a load-store path between a cache memory and a register; and wherein a ratio of a first number of bits in a vector register to a second number of bits in the load-store path rounded up to a nearest integer is M.

3. The method of claim 1, wherein the load-partial instruction is a load-partial-and-duplicate instruction which copies the partial-vector-sized datum to M register locations.

4. The method of claim 1, wherein the load-partial instruction is a load-partial-and-shift instruction which shifts register data to make room for the partial-vector-sized datum.

5. The method of claim 1, wherein the partial-vector-sized datum is loaded via a load-store path between a cache memory and a register; and wherein a ratio of a first number of bits in a vector register to a second number of bits in the load-store path rounded up to the nearest integer is M.

6. The method of claim 5, wherein in response to N being equivalent to the source address specified by the instruction modulo the partial-vector-sized datum length in bytes, the load-partial instruction rotates bytes in a direction determined by the endian-ness of the memory transaction, wherein the partial-vector-sized datum is rotated to the left N byte positions for a big-endian memory transaction, or the partial-vector-sized datum is rotated to the right N byte positions in the case of little-endian memory transactions.

7. A method for executing a store-partial instruction, comprising:

receiving the store-partial instruction to be executed, wherein the store-partial instruction specifies a destination address in memory, which is arbitrarily aligned; and executing the store-partial instruction, which involves storing a partial-vector-sized datum from a register into a naturally-aligned memory region encompassing the destination address, and in doing so, if the destination address is unaligned, rotating the bytes of the partial-vector-sized datum by swapping a set of bytes residing at addresses lower than the destination address with a set of bytes residing at addresses greater than or equal to the destination address, positions, wherein N is equivalent to either the destination address specified by the instruction modulo the vector length in bytes or the destination address specified by the instruction modulo the vector length in bytes subtracted from the vector length in bytes, wherein rotating the bytes of the partial-vector-sized datum occurs after the partial-vector-sized datum moves out of the register, and wherein rotating the bytes of the partial-vector-sized datum involves using alignment circuitry which is located along a load-store path between the memory and the register to cause the least significant byte of the partial-vector-sized datum to be stored at the specified destination address on a little-endian processor, or to cause the most significant byte of the partial-vector-sized datum to be stored at the specified destination address on a big-endian processor, or to cause a specified byte to be stored to the destination address in the case of an endian-specific store-partial partial variant.

8. The method of claim 7, wherein the partial-vector-sized datum is stored via a load-store path between a cache memory and a register; and wherein a ratio of a first number of bits in a vector register to a second number of bits in the load-store path rounded up to a nearest integer is M.

9. The method of claim 8, wherein if the store-partial instruction is a store-leading-partial instruction, storing the partial-vector-sized datum to the destination address involves:

storing a whole partial-vector-sized datum to the destination address if the destination address is naturally aligned; and storing a portion of the partial-vector-sized datum to the destination address if the destination address is unaligned.

10. The method of claim 8, wherein if the store-partial instruction is a store-trailing-partial instruction, storing the partial-vector-sized datum to the destination address involves:

storing nothing to the destination address if the destination address is aligned with memory; or storing a portion of the partial-vector-sized datum to the destination address if the destination address is unaligned.

11. The method of claim 7, wherein the partial-vector-sized datum is stored via a load-store path between a cache memory and a register; and wherein a ratio of a first number of bits in a vector register to a second number of bits in the load-store path rounded up to a nearest integer is M.

12. The method of claim 11, wherein in response to N being equivalent to the destination address specified by the instruction modulo the partial-vector-sized datum length in bytes, the store-partial instruction rotates bytes in a direction determined by the endian-ness of the memory transaction, wherein the partial-vector-sized datum is rotated to the left N byte positions for a big-endian memory transaction, or the partial-vector-sized datum is rotated to the right N byte positions in the ease of little-endian memory transactions.

13. A method for executing a load-control-vector-partial instruction, comprising:

receiving a load-control-vector-partial instruction to be executed, wherein the load-control-vector-partial instruction specifies a target address in memory, which is arbitrarily aligned; and executing the load-control-vector-partial instruction to construct a control vector comprising predicate elements, wherein executing the load-control-vector-partial instruction involves determining a value N, wherein N is the specified target address modulo a length in bytes of a partial-vector-sized datum, wherein the predicate elements comprise a true polarity and a false polarity, wherein the control vector is constructed based on N and an endian-ness of a memory transaction, wherein for a big-endian memory transaction the N most-significant elements in the control vector are set to the true polarity and the remaining elements of the vector are set to the false polarity, wherein for a little-endian memory transaction the N least-significant elements in the control vector are set to the true polarity and the remaining elements of the vector are set to the false polarity, and wherein the control vector is used by a vector select instruction to determine which individual bytes from multiple vectors are selected to merge into a single output vector.

14. The method of claim 1, wherein the N elements in the control vector are the N most-significant elements in the partial-vector-sized datum.

15. The method of claim 13, wherein the N elements in the control vector are the N least-significant elements in the partial-vector-sized datum.

16. A computer system computer configured to execute a load-partial instruction, comprising:

a processor;

a memory;

an instruction fetch unit within the processor configured to fetch the load-partial instruction to be executed, wherein the load-partial instruction specifies a source address in memory, which is arbitrarily aligned; and an execution unit within the processor configured to execute the load-partial instruction by loading a partial-vector-sized datum from a naturally-aligned memory region encompassing the source address into a register, and in doing so, if the source address is unaligned, rotating the bytes of the partial-vector-sized datum by swapping a set of bytes residing at addresses greater than or equal to the source address, wherein rotating the bytes of the vector involves rotating the bytes N positions, wherein N is equivalent to either the source address specified by the instruction modulo the vector length in bytes or the source address specified by the instruction modulo the vector length in bytes subtracted from the vector length in bytes, wherein rotating the bytes of the partial-vector-sized datum occurs before the partial-vector-sized datum reaches the register, and wherein rotating the bytes of the partial-vector-sized datum involves using alignment circuitry which is located along a load-store path between the memory and the register to cause the byte at the specified source address to reside at the least-significant byte position within the partial-vector-sized datum for a little-endian memory transaction, or causing the byte to be positioned at the most-significant byte position within the partial-vector-sized datum for a big-endian memory transaction.

17. A computer system configured to execute a store-partial instruction, comprising:

a processor;

a memory;

an instruction fetch unit within the processor configured to fetch the store-partial instruction to be executed, wherein the store-partial instruction specifics a destination address in memory, which is arbitrarily aligned; and an execution unit within the processor configured to execute the store-partial instruction by storing a partial-vector-sized datum from a register into a naturally-aligned memory region encompassing the destination address, and in doing so, if the destination address in unaligned, rotating the bytes of the partial-vector-sized datum by swapping a set of bytes residing at addresses lower than the destination address with a set of bytes residing at addresses greater than or equal to the destination address, wherein rotating the bytes of the vector involves rotating the bytes N positions, wherein N is equivalent to either the source address specified by the instruction modulo the vector length in bytes or the source address specified by the instruction modulo the vector length in bytes subtracted from the vector length in bytes, wherein rotating the bytes of the partial-vector-sized datum occurs after the partial-vector-sized datum moves out of the register, and wherein rotating the bytes of the partial-vector-sized datum involves using alignment circuitry which is located along a load-store path between the memory and the register to cause the least significant byte of the partial-vector-sized datum to be stored to at the specified destination address on a little-endian processor, or to cause the most significant byte of the partial-vector-sized datum to be stored to the destination address on a big-endian processor, or to cause the specified byte to be stored to the destination address in the case of an endian-specific store-partial variant.

18. A computer system configured to execute a load-control-vector-partial instruction, comprising:

a processor;

a memory;

an instruction fetch unit within the processor configured to fetch the load-control-vector-partial instruction to be executed, wherein the load-control-vector-partial instruction specifies a target address in memory, which is arbitrarily aligned; and an execution unit within the processor configured to execute the load-control-vector-partial instruction to construct a control vector comprising predicate elements, wherein executing the load-control-vector-partial instruction involves determining a value N, wherein N is the specified target address modulo the partial-vector-sized datum length in bytes, wherein the predicate elements comprise a true polarity and a false polarity, wherein the control vector is constructed based on N and an endian-ness of a memory transaction, wherein for a big-endian memory transaction the N most-significant elements in the control vector are set to the true polarity and the remaining elements of the vector are set to the false polarity, and wherein for a little-endian memory transaction the N least-significant elements in the control vector are set to the true polarity and the remaining elements of the vector are set to the false polarity, and wherein the control vector is used by a vector select instruction to determine which individual bytes from multiple vectors are selected to merge into a single output vector.

* * * * *

UNITED STATES PATENT AND TRADEMARK OFFICE
CERTIFICATE OF CORRECTION

| | |
|---|---|
| PATENT NO. | : 7,624,251 B2 |
| APPLICATION NO. | : 11/655656 |
| DATED | : November 24, 2009 |
| INVENTOR(S) | : Jeffry E. Gonion et al. |

Page 1 of 1

It is certified that error appears in the above-identified patent and that said Letters Patent is hereby corrected as shown below:

In claim 5 (at column 13, line 50), please replace the word "the" with the word --a--.

In claim 7 (at column 14, line 6), please insert the following line after "destination address":
--wherein rotating the bytes of the vector involves rotating the bytes N-- so that the line reads:
--destination address, wherein rotating the bytes of the vector involves rotating the bytes N positions--.

In claim 7 (at column 14, line 24), please delete one of the duplicated words "partial" so the line reads: --an endian-specific store-partial variant--.

In claim 12 (at column 14, line 65), please replace the word "ease" with the word --case--.

In claim 16 (at column 15, line 31), please delete the word "computer" after "A computer system" so the line reads: --A computer system configured to execute a--.

In claim 17 (at column 16, line 5), please replace the word "specifics" with the word --specifies--.

In claim 17 (at column 16, line 17), please replace the word "wherein" with the word --where--.

In claim 18 (at column 16, line 56), please delete the word "and" at the end of the line.

Signed and Sealed this

Nineteenth Day of January, 2010

David J. Kappos
*Director of the United States Patent and Trademark Office*